Patented Feb. 6, 1940

2,189,468

UNITED STATES PATENT OFFICE 2,189,468

SULPHURIZED POLYMER OF DIHYDRONAPHTHALENE

William Hoffman Kobbé, New York, N. Y.

No Drawing. Application March 30, 1939,
Serial No. 264,977

8 Claims. (Cl. 260—79)

This invention relates to plastic compositions and has to do particularly with a sulphur-containing resin or gum and a method for the preparation thereof.

The composition of matter embraced within the scope of the invention, comprises a reaction product between sulphur and a hydrocarbon resin or gum which is a solid polymeric derivative of dihydronaphthalene prepared according to the method disclosed in the United States patent of Scott and Walker, No. 2,055,708, September 29, 1936.

This resin is known as "RH—35", as referred to in the Journal of Industrial and Engineering Chemistry, March, 1935, page 37. This resin is a white solid, odorless, and dissolves readily in gasoline, acetone, benzene, carbon tetrachloride and ether. A particular "RH—35" resin employed had a melting point of about 180° F., a refractive index at 26° C. of about 1.706, and had a bromine addition number of 9.

In manufacturing the composition in accordance with the invention, I prefer to use equal parts by weight of the resin and sulphur although this proportion is subject to modification for particular purposes or results. I prefer to fuse the resin and then add the sulphur. The two are miscible in the fused condition and begin to react at about 140° C. I prefer, however, to raise the temperature to at least about 140° C. and preferably around 165° C. and to maintain this temperature to effect a slow reaction for a period of from about 30 minutes to 2 hours or longer, depending upon the properties desired in the final product. For many purposes, a period of reaction of 1½ hours produces a sulphur product which is soluble in many substances in which sulphur alone is insoluble.

The sulphurized product is readily soluble in petroleum and vegetable oils, turpentine, xylol, chlorinated solvents, essential oils, waxes, greases, etc.

The invention is not limited to the above example which has reference to the preparation of a product suitable for addition to mineral oil, such as lubricating oils, to produce cutting oils or other sulphurized mineral oil products. Obviously the product is useful for other purposes and it is to be understood that the proportions of ingredients may vary to suit the individual needs. The resin and sulphur react at elevated temperatures or become miscible in substantially all proportions; therefore, the proportion of resin to sulphur is by no means limited to a 1:1 proportion, such as given in the example, but this proportion may vary within substantially any limits desired.

The exact nature of the reaction between the sulphur and the resin is not entirely understood, although there appears to be, at least in part, a definite chemical combination. Regardless of the nature and extent of the chemical reaction between the two substances, the sulphur is transformed into products which possess many of the characteristics of colloidal sulphur but is very readily soluble in various mediums.

This is a continuation-in-part of my application Serial No. 128,632, filed March 2, 1937.

Obviously many modifications and variations of the invention, as hereinbefore set forth, may be made without departing from the spirit and scope thereof, and therefore only such limitations should be imposed as are indicated in the appended claims.

I claim:

1. A composition of matter comprising the product obtained by subjecting a normally solid resinous polymer of dihydronaphthalene and sulphur to a temperature above the fusion point of the reactants but not greatly in excess of about 165° C.

2. A sulphurized composition comprising mainly a normally solid resinous polymer of dihydronaphthalene reacted with sulphur at a temperature of about 165° C.

3. A sulphurized resin comprising mainly a tetramer of dihydronaphthalene reacted with sulphur at a temperature of about 140° C. to about 165° C.

4. A sulphurized resin comprising mainly a tetramer of dihydronaphthalene reacted with about an equal amount by weight of sulphur at about 165° C.

5. A process for the manufacture of sulphurized compositions, which comprises subjecting a normally solid resinous polymer of dihydronaphthalene and sulphur to a temperature of about 140° C. to about 165° C. for sufficient time to obtain a homogeneous product.

6. A process for the manufacture of a sulphurized composition, which comprises heating a normally solid resinous polymer of dihydronaphthalene to a temperature between about 140° C. and about 165° C. and while at said temperature, reacting the same with sulphur for sufficient time to obtain a homogeneous product.

7. A process for the manufacture of a sulphurized resin, which comprises heating a tetramer of dihydronaphthalene to a temperature of about 140° C. to about 165° C. for sufficient time to obtain a homogeneous product.

8. A process for the manufacture of a sulphurized resin, which comprises heating about equal quantities by weight of sulphur and a tetramer of dihydronaphthalene to a temperature of about 165° C. and maintaining the temperature until a homogeneous product is obtained.

WILLIAM HOFFMAN KOBBÉ.